United States Patent [19]

Foh et al.

[11] 4,332,650

[45] Jun. 1, 1982

[54] THERMOELECTROCHEMICAL PROCESS USING COPPER OXIDE FOR PRODUCING HYDROGEN AND OXYGEN FROM WATER

[75] Inventors: Stephen E. Foh, Chicago; Mono M. Mazumder, Westmont; Jon B. Pangborn, Lisle, all of Ill.

[73] Assignee: Gas Research Institute, Chicago, Ill.

[21] Appl. No.: 226,749

[22] Filed: Jan. 21, 1981

[51] Int. Cl.³ ............................ C25B 1/04; C25B 1/22
[52] U.S. Cl. .................................. 204/104; 204/129; 423/579; 423/648 R
[58] Field of Search ................ 204/104, 129; 423/579, 423/648 R

[56] References Cited

U.S. PATENT DOCUMENTS

| | | | |
|---|---|---|---|
| 3,907,980 | 9/1975 | Pangborn | 204/129 |
| 3,939,257 | 2/1976 | Pangborn et al. | 423/658 |
| 3,998,942 | 12/1976 | Pangborn et al. | 423/658 |
| 4,080,436 | 3/1978 | Fremery et al. | 204/129 |
| 4,192,726 | 3/1980 | Pangborn et al. | 204/129 |
| 4,244,794 | 1/1981 | Hollabaugh et al. | 204/129 |

OTHER PUBLICATIONS

The Westinghouse Sulfur Cycle for the Thermochemical Decomposition of Water, L. E. Brecher, S. Spewock, C. J. Warde, in 1st World Hydrogen Energy Conference, edited by T. Nejat Veziroglu, vol. 1, Miami Beach, Florida, Mar. 1976.
Status of Thermochemical Water-Splitting Development at General Atomic, General Atomic Report GA-A14666, Oct. 1977, J. R. Schuster, J. L. Russell, Jr., J. H. Norman, T. Ohno and P. W. Trester.
Water Splitting—A Process Report, First World Hydrogen Energy Conference Proceedings—vol. 1, Miami Beach, Florida, Mar. 1976, as described by Russell of General Atomic Company.

*Primary Examiner*—R. L. Andrews
*Attorney, Agent, or Firm*—Thomas W. Speckman

[57] ABSTRACT

A thermoelectrochemical process for production of hydrogen and oxygen from water providing a closed cycle reactant regenerative process wherein the primary energy input is thermal and a smaller electrical energy input is required for an electrolysis step. The process is a hybrid copper oxide-copper sulfate water splitting cycle using copper oxide reactant in the reactions producing both hydrogen and oxygen providing two phase reaction products in each step.

36 Claims, 3 Drawing Figures

THERMOELECTROCHEMICAL PROCESS USING COPPER OXIDE FOR PRODUCING HYDROGEN AND OXYGEN FROM WATER

BACKGROUND OF THE INVENTION

1. Field of the Invention

This invention relates to a thermoelectrochemical process for production of hydrogen and oxygen from water. The process provides a closed cycle reactant regenerative process for the production of hydrogen and oxygen from water requiring input of water, heat and a relatively small amount of electrical energy. The process is a hybrid copper oxide-copper sulfate water splitting cycle using copper oxide reactant in the reactions producing both hydrogen and oxygen providing two phase reaction products in each step.

2. Description of the Prior Art

Thermochemical cycles to produce hydrogen have been sought in recent years to provide hydrogen for use both as a fuel and as a chemical reactant. Especially in view of ecological and pollution considerations, the use of hydrogen as a fuel has attained greater significance. Hydrogen may be produced from water, a cheap and abundant raw material, and when burned reverts to water, a natural, non-polluting substance. Hydrogen also affords extreme flexibility in its utilization as a fuel providing advantages in many ways over present fuels for power sources such as turbines, reciprocating engines and fuel cells.

The present commercial method for the production of hydrogen is the direct electrolysis of water into its constituent elements of hydrogen and oxygen. The electrolysis process is dependent entirely upon electricity, and therefore its economics are dependent upon generation of electrical energy which is relatively inefficient.

Direct thermodecomposition of water is not promising, since water starts decomposing with a reasonable yield at temperatures of 2,500° to 3,000° C. These temperatures (2,500° to 3,000° C.) are not attainable from heat sources such as nuclear reactors. Therefore, thermochemical cycles for production of hydrogen and oxygen from water at temperatures attainable from the core coolant of nuclear reactors and from solar energy sources would be desirable. With expanded use of nuclear reactors, it would be advantageous to utilize the heat given off by the reactor to produce hydrogen and oxygen from the water molecule thereby providing a new fuel. High temperature gas-cooled reactors have output coolant temperatures in the order of 650° to 950° C. This heat output represents at least 80 percent of the product energy from the nuclear reactor. Recent trends have been toward increases in the output coolant temperature and such temperatures in the order of 1,000° to 1,200° C. can be expected as a development of present technology and as a reasonable goal for nuclear fusion reactors in the future. Thermochemical processes for the production of hydrogen, utilizing such heat energy, have been sought in recent years.

Various thermochemical cycles for the production of hydrogen and oxygen from water have been referred to in U.S. Pat. No. 3,907,980. Other thermochemical cycles for the production of hydrogen and oxygen from water using iron chlorides are disclosed in U.S. Pat. Nos. 3,939,257 and 3,998,942. The process disclosed in U.S. Pat. No. 3,907,980 is illustrative of a process for production of hydrogen and oxygen from water combining thermo and electrochemical reactions. The process disclosed by U.S. Pat. No. 3,907,980 teaches electrically hydrolyzing a cadmium anode and recycling the cadmium to the electrochemical reaction with removal of hydrogen and oxygen from the reaction system.

Thermochemical cycles for the production of hydrogen and oxygen from water utilizing sulfur oxides have been proposed. One process known as The Westinghouse Sulfur Cycle, is a two-step thermochemical cycle for decomposition of water into hydrogen and oxygen wherein oxides of sulfur serve as recycled intermediates within the system. The process is described in the paper The Westinghouse Sulfur Cycle for the Thermochemical Decomposition of Water, L. E. Brecher, S. Spewock and C. J. Warde, in 1st World Hydrogen Energy Conference, Conference Proceedings edited by T. Nejat Veziroglu, Vol 1, Miami Beach, Fla., March 1976. One disadvantage of the Westinghouse Sulfur Cycle is that it involves concentrated acids, principally sulfuric acid, leading to corrosion of process plant components.

Another proposed thermochemical water splitting process for the production of hydrogen and oxygen is a cycle based upon sulfur and iodine which was described first by Russell of General Atomic Company in "Water-Splitting—A Progress Report", First World Hydrogen Energy Conference Proceedings, Vol. 1, Miami Beach, Fla., March 1976. The process is further described in a paper presented at the Ninth Synthetic Pipeline Gas Symposium, Oct. 31–Nov. 2, 1977, Des Plaines, Ill., J. R. Schuster, J. L. Russell, Jr., J. H. Norman, T. Ohno and P. W. Trester, "Status of Thermochemical Water-Splitting Development at General Atomic", General Atomic Report GA-A14666, October, 1977. The General Atomic process involves both sulfuric acid and hydrogen iodide causing corrosion problems in conventional plant process equipment.

U.S. Pat. No. 4,192,726 discloses a thermoelectrochemical reactant regenerative closed cycle process for production of hydrogen and oxygen from water wherein sulfur trioxide is catalytically thermally decomposed in a gas-phase reaction. The reaction products are gaseous and require separation.

SUMMARY OF THE INVENTION

This invention provides a process for the production of hydrogen and oxygen from water in a reactant regenerative closed cycle process comprising the steps of electrolytically oxidizing in an electrochemical reaction cell an aqueous solution of sulfur dioxide in the presence of cupric oxide to produce copper sulfate hydrate in an anode chamber while producing hydrogen in a separated cathode chamber and removing the produced hydrogen from the cycle; thermally dehydrating crystallized copper sulfate hydrate to copper sulfate and steam; thermally decomposing copper sulfate forming cupric oxide which is recycled to the electrochemical reactor and sulfur trioxide which is reacted with cuprous oxide to form sulfur dioxide for recycle to the electrochicam reactor and cupric oxide which is thermally decomposed to cuprous oxide and to oxygen which is removed from the cycle.

It is an object of this invention to provide a process for producing hydrogen and oxygen from water which overcomes many of the disadvantages of the prior art processes.

It is another object of this invention to provide a process for producing hydrogen and oxygen from water wherein the primary energy requirement is thermal; with a smaller electrical energy input being required for an electrochemical step.

It is a further object of this invention to provide an efficient combined thermochemical-electrochemical process for the production of hydrogen and oxygen from water.

It is yet another object of this invention to provide a process for producing hydrogen and oxygen from water which does not involve corrosive materials, such as acids at elevated temperatures, and thus permit plant construction of more economical materials.

It is still a further object of this invention to provide a process for producing hydrogen and oxygen from water which can produce pressurized hydrogen thereby eliminating or reducing later compression requirements when pressurized hydrogen is desired.

It is a further object of this invention to provide a process for the production of hydrogen and oxygen from water in which the reactants other than water, are regenerated and the reaction may be conducted in a closed cycle.

It is yet another object of this invention to provide a process for the production of hydrogen and oxygen from water wherein the thermal coolant output of nuclear reactors and/or solar energy sources, may be used to provide the thermal energy input.

It is still another object of this invention to provide a process for production of hydrogen and oxygen from water which eliminates the need to separate two or more gaseous reaction products and which produces reaction products in different phases.

These and other objects, advantages and features of this invention will be apparent from the description together with the drawings, wherein.

DESCRIPTION OF THE PREFERRED EMBODIMENTS

The chemical reactions taking place in the overall process may be expressed by the following chemical reactions:

$$CuO_{(s)} + SO_{2(g)} + (x+1)H_2O_{(l)} \rightarrow CuSO_4 \cdot xH_2O_{(s)} + H_{2(g)} \qquad \text{I.}$$

$$CuSO_4 \cdot xH_2O_{(s)} \rightarrow CuSO_{4(s)} + xH_2O_{(g)} \qquad \text{II.}$$

$$CuSO_4 \cdot 5H_2O_{(s)} \rightarrow CuSO_4 \cdot 3H_2O_{(s)} + 2H_2O_{(g)} \qquad \text{(a)}$$

$$CuSO_4 \cdot 3H_2O_{(s)} \rightarrow CuSO_4 \cdot H_2O_{(s)} + 2H_2O_{(g)} \qquad \text{(b)}$$

$$CuSO_4 \cdot H_2O_{(s)} \rightarrow CuSO_{4(s)} + H_2O_{(g)} \qquad \text{(c)}$$

$$CuSO_{4(s)} + Cu_2O_{(s)} \rightarrow 3CuO_{(s)} + SO_{2(g)} \qquad \text{III.}$$

$$CuSO_{4(s)} \rightarrow CuO_{(s)} + SO_{3(g)} \qquad \text{(a)}$$

$$Cu_2O_{(s)} + SO_{3(g)} \rightarrow 2CuO_{(s)} + SO_{2(g)} \qquad \text{(b)}$$

$$2CuO_{(s)} \rightarrow Cu_2O_{(s)} + \tfrac{1}{2}O_{2(g)} \qquad \text{IV.}$$

Figure 1:
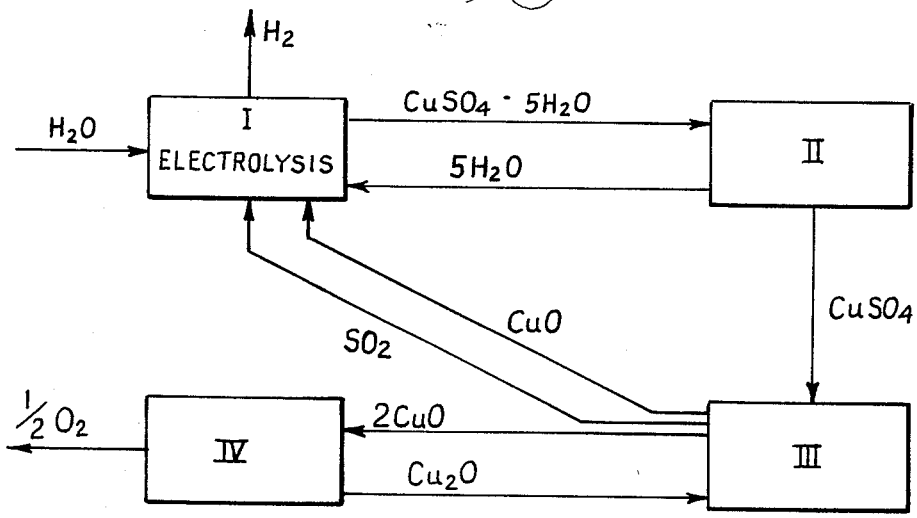
FIG. 1 is a schematic flow diagem of one embodiment of a closed cycle for production of hydrogen and oxygen according to this invention.

The combination of the above reactions, utilized in one embodiment of this invention, are schematically shown in the flow diagram of FIG. 1. The zones of FIG. 1 marked I through IV are the zones in which corresponding Reactions I through IV occur. FIG. 1 shows qualitative recycle information for a reactant regenerative closed cycle process. In reaction step I, the value of x is 5 for temperatures below about 100° C.; the value of x declines reducing the water of hydration to zero at temperatures above about 250° C. and pressures up to 12 atm. Further, explanation of the above reactions is set forth in the following description setting forth preferred embodiments of this invention in a reactant regenerative closed cycle. By the term "reactant regenerative closed cycle" is meant a system which minimizes the addition (make-up) of reactant chemicals other than water and which minimizes reaction products to be removed from the cycle other than the desired gaseous hydrogen and gaseous oxygen. Make-up reactant chemicals may, of course, be added as necessary. Throughout this description and claims, the terms "water" and "steam" are used recognizing that under appropriate process conditions of temperature and pressure, either may be present and thus both of these terms refer to both liquid and vapor phases.

Reaction I may be written as the following separate reactions:

$$SO_{2(g)} + H_2O_{(l)} \rightarrow H_2SO_{4(aq)} + 2H^+ + 2e^- \qquad \text{Ia.}$$

$$2H^+ + 2e^- \rightarrow H_{2(g)} \qquad \text{Ib.}$$

$$CuO_{(s)} + H_2SO_{4(aq)} + 4H_2O_{(l)} \rightarrow CuSO_4 \cdot 5H_2O_{(s)} \qquad \text{Ic.}$$

These reactions are written under conditions of five molecules of water of hydration or x=5 in Reaction I. Reactions Ia and Ib are electrochemical reactions and reaction Ic is a thermochemical reaction. Reactions Ia, Ib and Ic may be performed in an electrochemical reactor or reactions Ia and Ib may be performed in an electrochemical reactor and reaction Ic may be performed in a separate vessel using electrolytically produced sulfuric acid. The electrolysis reactions proceed in an electrochemical reactor in which the cathode chamber is separated from the anode chamber. Hydrogen is evolved at the cathode. In the electrochemical reaction $SO_{2(g)}$ may be bubbled and dissolved in the anolyte which comprises aqueous sulfuric acid, less than 50 weight percent and preferably about 25 to 35 weight percent sulfuric acid. Homogeneous phase catalysts may be used in the anolyte for the anode chamber reaction. Preferred are iodide salt catalysts, the salt being formed with hydrogen or any metal capable of displacing hydrogen from acid, such as potassium iodide or sodium iodide. Potassium or sodium iodide is preferred. Suitable concentrations, based upon iodide, are about 0.005 to about 0.1 Molar, about 0.01 to about 0.05 Molar being preferred. Use of hydrogen iodide in production of hydrogen from sulfur dioxide and water is described by B. D. Struck, et al, The Anodic Oxidation of Sulfur Dioxide in the Sulfuric Acid Hybrid Cycle; International Journal of Hydrogen Energy, Vol. 5, No. 5, pgs. 487–497; (1980).

When reactions Ia, Ib and Ic are conducted simultaneously in the electrochemical cell, solid cupric oxide may be slurried in the anolyte or used directly as a consumable anode. In the presence of sulfuric acid and water in the anode chamber, slurried cupric oxide reacts to form aqueous copper sulfate solution. Solid copper sulfate hydrate may be recovered by either operating with the anolyte saturated with copper sulfate or by performing a separate crystallization step. The net reaction in the anode chamber is Reaction Id:

$$CuO_{(s)} + SO_{2(g)} + 6H_2O_{(l)} \rightarrow CuSO_4 \cdot 5H_2O_{(s)} + 2H^+ + 2e^-  \quad \text{Id}$$

Hydrogen ions generated in the anode chamber migrate to the cathode chamber, through the separator, where they are electrolyzed to hydrogen gas at the cathode. The reaction in the cathode chamber is expressed by Reaction Ib above.

The electrochemical reactor must be operated so that substantially no sulfur oxides or hydrogen sulfur oxides can diffuse into the cathode chamber. Suitable separators for the electrochemical reactor may be any porous medium or membrane which accomplishes the above objective. Microporous polyethylene is satisfactory and other commercially available cell or battery separators are suitable. A small amount of the catholyte may be convected through the anode-cathode separator as a means to prevent diffusion of sulfur oxides or hydrogen sulfur oxides into the cathode chamber. This is most conveniently done by maintaining a very slight, 10-20 cm water column, pressure difference between the catholyte and anolyte chambers. This can be accomplished by using different heights of their respective electrolyte levels. Copper oxide is slurried in water in the anode chamber and sulfur dioxide is sparged into the anolyte. Copper sulfate, in aqueous solution, is produced in the anode chamber while producing hydrogen in the separated cathode chamber as more fully described above. Noble metals, such as platinum or platinum coated materials, graphite and porous carbon are suitable electrode materials for the electrolysis reaction. Tests have shown, using distilled water as the electrolyte and 0.010 inch thick separator of micro-porous polyethylene sheet material sold by W. R. Grace Company under the mark DARAMIC for automotive battery separator material, using a 10 cm water column pressure differential between the cathode chamber and anode chamber, that hydrogen gas was generated in the cathode chamber while copper sulfate in solution was recovered from the anolyte in the anode chamber following operation at cell voltages between about 0.6 and 0.85 volts and current densities of 10 to 25 mA/cm$^2$ (E°$_{298}$=0.150 volts). Laboratory tests have indicated that the desired reaction proceeds at potentials as low as 0.45 volts when potassium iodide is used as a homogenous catalyst in the anolyte and that with optimized conditions the potentials may be lower, such as 0.40 volts. Fluidized electrolyte systems permitting large current densities at low polarizations may be used in highly mixed electrolytes in electrochemical reactors.

One important aspect of this invention is the low electrical potential requirement for the electrolysis reaction of Equation I. Conventional electrolysis to produce hydrogen and oxygen from water requires electrical potentials greater than about 1.48 volts, while the electrical potential requirement for electrolysis of this invention has been demonstrated at 0.45 volts. The process of this invention requires less than about 50 kilocalories (thermal) per gram mol of hydrogen produced to drive the electrolysis of Equation I, whereas conventional electrolysis of water requires more than 250 kilocalories (thermal) to generate the necessary electricity. The electrical potential requirements for the electrolysis of Equation I are sufficiently low that direct photoelectric or thermoelectric solar energy sources, such as photovoltaic or diode solar cells, thermocouples and the like, can be utilized.

The electrolysis of Reaction Ia and thermochemical Reaction Ic are desirably carried out at temperatures of about 10° to 90° C., preferred temperatures being about 25° to 60° C., at 1 atmosphere pressure. At high pressures, the temperature may be correspondingly higher as long as the electrolyte is maintained in liquid form. Elevated pressures for the electrolysis reaction, to produce pressurized hydrogen are dependent upon material strengths and containment. However, pressures up to about 50 to 100 atmospheres are suitable for delivery of hydrogen to fuel gas transmission pipelines. At elevated pressures, the electrical energy inputs for electrolysis are only slightly increased, but there is an overall energy advantage to production of hydrogen by pressure electrolysis as compared to later mechanical compression. The process of this invention may be carried out at sufficiently high pressures so that further compression to produce pipeline pressures may not be necessary.

The copper sulfate hydrate may be produced from the electrolyzer product solution by crystallization. Crystallization of hydrate can be achieved by one of or a combination of five techniques:

(1) heating the solution to evaporate water, thereby concentrating the solution and exceeding the solubility of the hydrated salt, (2) cooling the solution to exceed the saturation solubility of the hydrated salt, (3) electrolyzing into a saturated solution and thereby driving crystal formation by addition of copper sulfate, (4) dropping the pressure of the electrolyzer product solution (partial flash evaporation thereby also cooling) accompanied by crystallization.

(5) heating the solution under containment in a pressure vessel so that the property of retrograde solubility of copper sulfate is utilized whereby copper sulfate becomes less soluble as the temperature is raised above 175° C.

Copper sulfate exhibits an unusual retrograde solubility with the solubility decreasing with an increase in temperature above 175° C. at 320° C. and 110 atmospheres, copper sulfate monohydrate is essentially insoluble in water. Precipitation of crystals of copper sulfate monohydrate from solution under high temperature and pressure serves to separate the monohydrate salt and reducing the pressure forms anhydrous copper sulfate (above about 250° C.). The retrograde solubility significantly lowers the energy input to the cycle by reducing the evaporation of the solution to recover the copper sulfate. The preferred process method is to raise the temperature of the solution containing dissolved copper sulfate to take advantage of its retrograde solubility.

If a low pressure crystallization process is used, the copper sulfate hydrate may have one to five molecules of water of hydration, dependent upon the temperature of crystallization. At 25° C., x=5, while at 75° C., x=1, predominantly. The hydrated copper sulfate is then passed to a reactor for thermal dehydration to copper sulfate and steam. The thermal dehydration of copper sulfate pentahydrate takes place in three steps represented by Reactions IIa, IIb and IIc, as set forth above.

Tests have shown that in a pure steam atmosphere, temperatures in excess of about 202° C. are required for complete dehydration and temperatures not exceeding about 402° C. will avoid decomposition of the copper sulfate. The thermal dehydration can be operated at elevated pressures to provide pressurized steam for power recovery and to provide the driving force for regeneration of some of the thermal energy required for the dehydration. Upper limits of pressure are set for any one step of dehydration by either the thermodynamic equilibrium pressure of steam or by the equilibrium between gaseous and liquid water, whichever is lower at the temperature used. Relative pressures of the three steps are determined by the need to provide a thermal driving force for internal heat transfer. This heat transfer utilizes the latent heat recovered from condensation of steam products, from dehydrations of copper sulfate trihydrate and copper sulfate hydrate, to supply the heat of reaction for dehydration of copper sulfate pentahydrate. Suitable temperatures and pressures for dehydration of copper sulfate pentahydrate to copper sulfate trihydrate (Reaction IIa) are about 100° to about 150° C., preferably about 100° to about 125° C., at about 1 to about 5 atmospheres pressure; copper sulfate trihydrate to copper sulfate hydrate (Reaction IIb) are about 130° to about 200° C., preferably about 140° to about 160° C., at about 3 to about 15 atmospheres pressure; and copper sulfate hydrate to copper sulfate (Reaction IIc) are about 200° to about 400° C., preferably about 225° to about 275° C., at about 3 to about 30 atmospheres pressure.

Reaction IIIa produces 1 mole solid cupric oxide and reaction IIIb produces 2 moles solid cupric oxide, exactly the proportions necessary for cycling to Reaction I and Reaction IV, respectively. The Reactions IIIa and IIIb are desirably conducted simultaneously and physically separated. By conducting these reactions physically separated, the excess cuprous oxide desired to ensure complete conversion of $SO_3$ to $SO_2$ is limited to the environment of Reaction IIIb, the cupric oxide product of Reaction IIIa would not be contaminated by cuprous oxide, and the pure cupric oxide product of Reaction IIIa can be recycled to the electrochemical reactor for Reaction I.

The dry copper sulfate is thermally decomposed in accordance with Reaction IIIa at temperatures of about 575° to 1025° C., preferably at about 800° to 1025° C. The solid CuO product is recycled to the electrochemical reactor and gaseous $SO_3$ is passed to a separate reactor as a reactant for Reaction IIIb. Reaction IIIb may be carried out at temperatures of about 575° to about 1025° C., preferably about 800° to about 1025° C. Reactions IIIa and IIIb may be carried out at any pressure compatible with vessels in the cycle in communication with the vessels in which these reactions are conducted and compatible with the pressure properties of the equipment used.

The thermal decomposition of cupric oxide, as shown by Reaction IV, produces cuprous oxide for recycle to the reaction of Reaction IIIb and oxygen for removal from the cycle. The thermal decomposition of cupric oxide is suitably carried out at temperatures greater than about 1000° but below 1100° C. Upper limits of temperature are governed by melting eutectic of cupric oxide and cuprous oxide which occurs above about 1100° C. It is preferred to carry out the reaction at a temperature just below the melting point of the eutectic. Preferably, the reaction is carried out at about 1050° to 1075° C.

Figure 2:
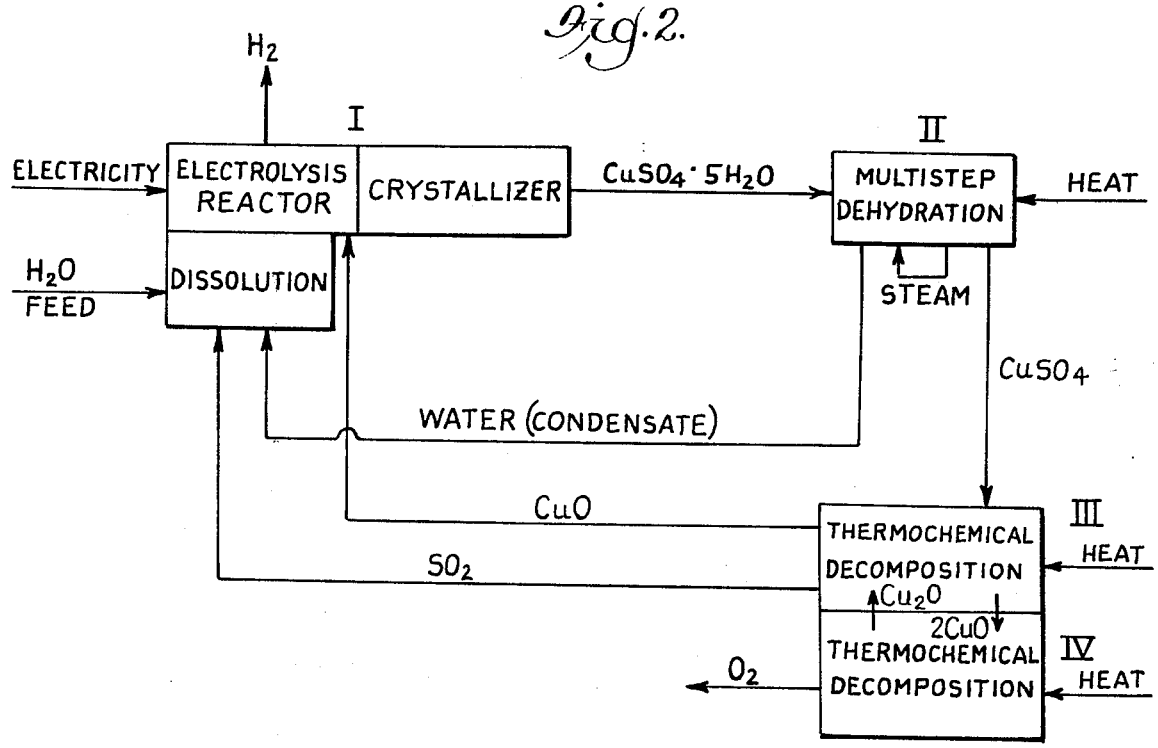
FIG. 2 is a simplified process flow diagram of one embodiment of this invention according to the schematic flow diagram of FIG. 1.

FIG. 2 shows a simplified process flow diagram of one embodiment of this invention according to the schematic flow diagram of FIG. 1. Like FIG. 1, the zones of FIG. 2 marked I through IV are the zones in which Reactions I through IV, occur. FIG. 2 shows energy inputs to the cycle and shows more detailed recycle information for a reactant regenerative closed cycle process than summarized in FIG. 1.

Figure 3:
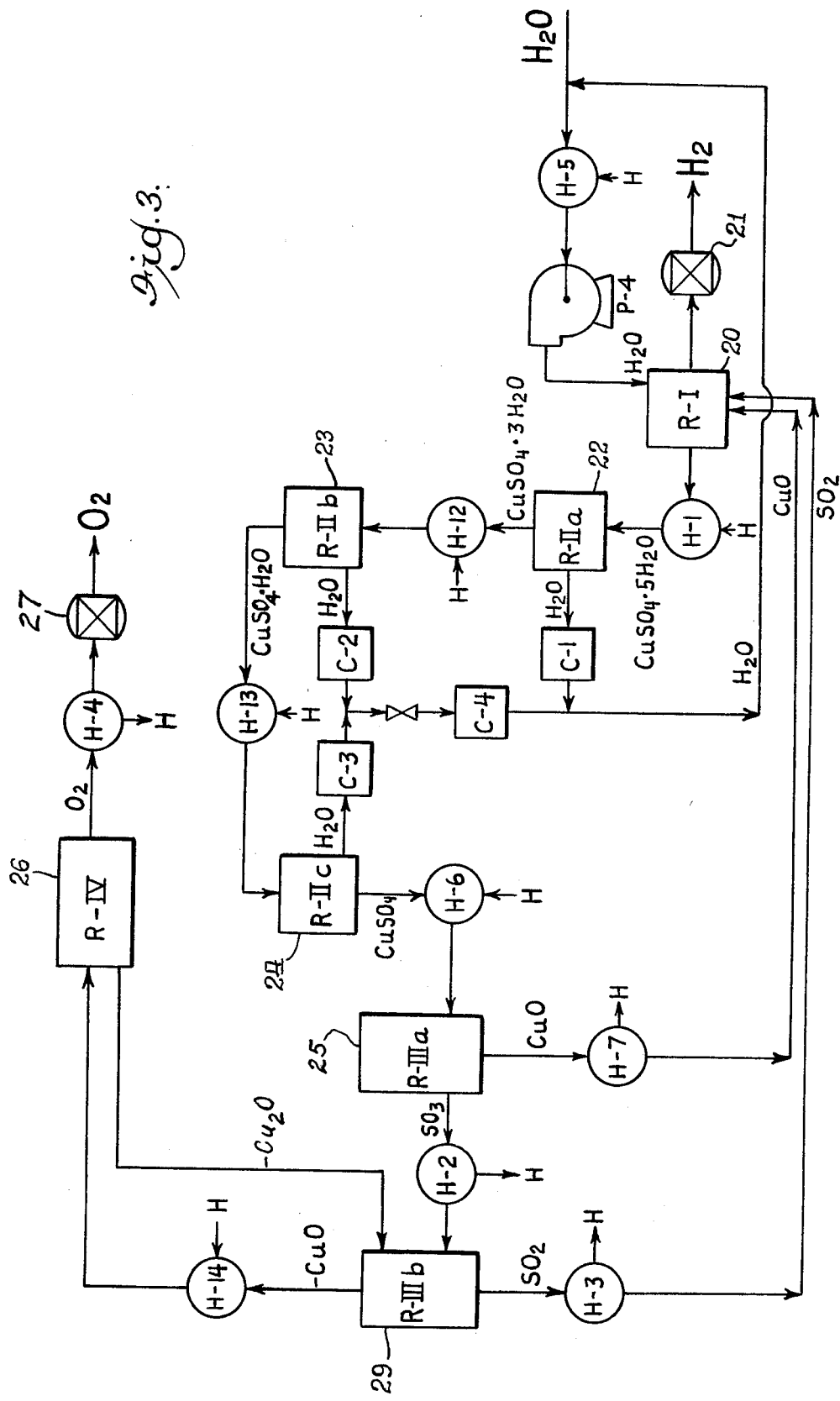
FIG. 3 is one embodiment of a process flow layout for the closed reactant regenerative cycle shown in FIG. 1.

FIG. 3 is a more detailed process flow layout of the reactant regenerative closed cycle shown in FIG. 2 and summarized in FIG. 1. FIG. 3 shows the reactors where reactions set forth above take place which are indicated by the reaction numbers stated above. Heat exchangers are shown with heat demands or availabilities as indicated by arrows in conjunction with the letters H. Steam condensers are shown with the letters C. Pumps and compressors are shown with the letters P. The chemical flow paths are shown, but are not balanced which would be within the knowledge of one skilled in the art upon reading this disclosure.

In FIG. 3, electrolyzer-crystallizer 20 is shown where Reaction I takes place. The electrolyzer may be operated under pressures to produce pressurized hydrogen, such as 50 atmospheres pressure. The reaction in electrolyzer 20 may be carried out at ambient temperatures of about 25° C. at which temperature the exothermic reaction generates 22 kcal which, since it is lower than the minimum heat sink temperature provided by cooling water, may be rejected. Operation of electrolyzer 20 at 0.45 volts represents a work requirement of 21 kcal. At higher temperatures which would be desirable to reduce the overvoltage of the electrolyzer, the voltage may be somewhat reduced. Hydrogen produced in accordance with Reaction I is passed through scrubber 21 and removed from the cycle. The crystallizer may be operated as described above.

FIG. 3 shows Reaction II being carried out in three separate reactors 22, 23 and 24, wherein the Reactions IIa, IIb and IIc take place, respectively. These reactions are conducted at increasing temperatures and pressures of, for example, 100° C. and 1 atm for Reaction IIa; 152° C. and 6 atm for Reaction IIb; and 253° C. and 12 atm for Reaction IIc, whereby the heat for Reaction IIa can be supplied by the latent heat of the steam produced by Reactions IIb and IIc, rather than by a primary heat source, only the latent heat of the steam produced by Reaction IIa being discarded.

The thermal decomposition of copper sulfate expressed by Reaction IIIa takes place in reactor 25. Solid cupric oxide produced by Reaction IIIa is recycled to electrolyzer 20. The produced sulfur trioxide is passed to reactor 29 for reaction according to Reaction IIIb with cuprous oxide to form $SO_2$ for recycle to electrolyzer 20 and cupric oxide for thermal decomposition in the oxygen producing step of Reaction IV in reactor 26.

The thermal decomposition of cupric oxide is carried out in reactor 26 at just below the melting point of the cupric oxide-cuprous oxide eutectic. The cuprous oxide is recycled to reactor 29 for Reaction IIIb and the produced oxygen is removed from the cycle through scrubber 27.

The condensate from Reactions IIa, IIb and IIc plus added feed water is compressed and fed to electrolyzer 20.

The most efficient utilization of process heat throughout the cycle will be readily apparent to one skilled in the art.

An enthalpy balance around a process flow such as shown in FIG. 3 wherein the minimum temperature difference between streams and heat exchangers is 25° C. shows higher efficiency for the overall process than the process described in U.S. Pat. No. 4,192,726.

Throughout this description and claims we have used the term "reaction zone" to describe where reactions identified take place. When we refer to reaction zones, we do not necessarily mean physically separate volumes, but different reaction zones may be within the same physical volume and under different conditions, such as temperature or pressure and referred to as different zones. Likewise, a single reaction zone may be divided into several physically different volumes under different conditions of temperature and pressure and still referred to as a single reaction zone, such as above with respect to the reactions of Reactions IIa, IIb and IIc and the electrolyzer-crystallizer as more fully described above. The terminology "reaction zones" has been employed to simplify the explanation of our invention.

Reactors and process equipment for carrying out the process of this invention may be of any suitable design and material as will be obvious to one skilled in the art in view of the chemicals, temperatures and pressures desired as set forth in this disclosure.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for the production of hydrogen and oxygen from water comprising the steps:
   electrolytically reacting in an electrochemical reactor an aqueous solution of sulfur dioxide to produce aqueous sulfuric acid in the anode chamber while producing hydrogen in a separated cathode chamber and removing said produced hydrogen from the cycle;
   reacting said aqueous sulfuric acid with cupric oxide producing solid copper sulfate hydrate;
   thermally dehydrating said copper sulfate hydrate to copper sulfate anhydride and steam;
   thermally decomposing said copper sulfate anhydride forming sulfur trioxide and cupric oxide for recycle with additional aqueous sulfuric acid;
   reacting said sulfur trioxide with cuprous oxide producing cupric oxide and sulfur dioxide, said sulfur dioxide being recycled to said electrochemical reactor; and
   thermally decomposing said cupric oxide produced from said reaction of sulfur trioxide with cuprous oxide to cuprous oxide and to oxygen and removing said oxygen from the cycle.

2. The process of claim 1 wherein reacting said aqueous sulfuric acid with cupric oxide is carried out in said anode chamber of said electrochemical reactor.

3. The process of claim 2 wherein said sulfuric acid concentration is about 25 to about 35 weight percent, the electrical potential across electrodes of said electrochemical reactor is about 0.4 to about 0.85 volts, and iodide salt homogeneous catalyst is present in the aqueous anolyte in said anode chamber.

4. The process of claim 1 wherein reacting said aqueous sulfuric acid with cupric oxide directly produces aqueous copper sulfate solution and crystallizing said aqueous copper sulfate solution to solid copper sulfate hydrate.

5. The process of claim 4 wherein said aqueous copper sulfate solution is heated above about 175° C. in a pressure vessel initiating retrograde solubility precipitating copper sulfate monohydrate from said solution.

6. The process of claim 5 wherein said copper sulfate monohydrate is crystallized at elevated pressures of up to 110 atmospheres at 320° C. followed by reduction of pressure while maintaining the temperature above about 250° C. dehydrating said copper sulfate monohydrate to copper sulfate anhydrite.

7. The process of claim 1 wherein copper sulfate hydrate is thermally dehydrated at increasing temperatures from about 100° to about 400° C. and increasing pressures from about 1 to about 30 atmospheres.

8. The process of claim 7 wherein said copper sulfate hydrate is copper sulfate pentahydrate and is thermally dehydrated to copper sulfate trihydrate at about 100° to about 150° C., said copper sulfate trihydrate dehydrated to copper sulfate monohydrate at about 130° to about 200° C., and said copper sulfate monohydrate dehydrated to copper sulfate anhydride at about 200° to about 400° C.

9. The process of claim 7 wherein copper sulfate pentahydrate is thermally dehydrated to copper sulfate trihydrate at about 100° to about 150° C. and about 1 to about 5 atmospheres pressure, copper sulfate trihydrate dehydrated to copper sulfate hydrate at about 130° to about 200° C. and about 3 to about 15 atmospheres pressure, and copper sulfate hydrate dehydrated to copper sulfate at about 200° to about 400° C. and about 3 to about 30 atmospheres pressure.

10. The process of claim 1 wherein said copper sulfate is thermally decomposed at about 575° to about 1025° C.

11. The process of claim 10 wherein said copper sulfate is thermally decomposed at about 800° to about 1025° C.

12. The process of claim 1 wherein said reaction of cuprous oxide and sulfur trioxide is carried out at about 800° to about 1025° C.

13. The process of claim 1 wherein said cupric oxide is thermally decomposed to cuprous oxide and oxygen at about 1000° to about 1100° C.

14. The process of claim 13 wherein said thermal decomposition is carried out at about 1050° to about 1075° C.

15. The process of claim 1 wherein the electrochemical reactor is operated at an elevated pressure thereby producing pressurized hydrogen.

16. The process of claim 15 wherein the electrochemical reactor is operated at about 5 to about 100 atmospheres pressure.

17. The process of claim 1 conducted in a reactant regenerative closed cycle wherein:
   said electrolytic reaction with aqueous sulfur dioxide producing aqueous sulfuric acid and hydrogen which is removed from the cycle and reaction of said aqueous sulfuric acid with cupric oxide producing solid copper sulfate hydrate takes place in a first reaction zone;

transferring the produced copper sulfate hydrate to a second reaction zone where it is thermally dehydrated to copper sulfate anhydride and steam, excess steam being recycled as water to the first reaction zone;

transferring the copper sulfate anhydride to a third reaction zone where it is thermally decomposed to cupric oxide and sulfur trioxide, said cupric oxide being recycled to said first reaction zone;

reacting said sulfur trioxide in a fourth reaction zone with cuprous oxide producing cupric oxide and sulfur dioxide, said sulfur dioxide being recycled to said first reaction zone;

transferring said cupric oxide to a fifth reaction zone and thermochemically decomposing it to cuprous oxide and oxygen, the produced cuprous oxide being recycled to the fourth reaction zone and the oxygen being removed from the cycle; and adding water to the cycle in the first reaction zone.

18. The process of claim 17 wherein reacting said aqueous sulfuric acid with cupric oxide is carried out in said anode chamber of said electrochemical reactor.

19. The process of claim 18 wherein said sulfuric acid concentration is about 25 to about 35 weight percent, the electrical potential across electrodes of said electrochemical reactor is about 0.4 to about 0.85 volts, and iodide salt homogeneous catalyst is present in the aqueous anolyte in said anode chamber.

20. The process of claim 17 wherein reacting said aqueous sulfuric acid with cupric oxide directly produces aqueous copper sulfate solution and crystallizing said aqueous copper sulfate solution to solid copper sulfate hydrate.

21. The process of claim 20 wherein said aqueous copper sulfate solution is heated above about 175° C. in a pressure vessel initiating retrograde solubility precipitating copper sulfate monohydrate from said solution.

22. The process of claim 21 wherein said copper sulfate monohydrate is crystallized at elevated pressures of up to 110 atmospheres at 320° C. followed by reduction of pressure while maintaining the temperature above about 250° C. dehydrating said copper sulfate monohydrate to copper sulfate anhydrite.

23. The process of claim 17 wherein copper sulfate hydrate is thermally dehydrated at increasing temperatures from about 100° to about 400° C. and increasing pressures from about 1 to about 30 atmospheres.

24. The process of claim 23 wherein copper sulfate pentahydrate is thermally dehydrated to copper sulfate trihydrate at about 100° to about 150° C., copper sulfate trihydrate dehydrated to copper sulfate hydrate at about 130° to about 200° C., and copper sulfate hydrate dehydrated to copper sulfate at about 200° to about 400° C.

25. The process of claim 23 wherein copper sulfate pentahydrate is thermally dehydrated to copper sulfate trihydrate at about 100° to about 150° C. and about 1 to about 5 atmospheres pressure, copper sulfate trihydrate dehydrated to copper sulfate hydrate at about 130° to about 200° C. and about 3 to about 15 atmospheres pressure, and copper sulfate hydrate dehydrated to copper sulfate at about 200° to about 400° C. and about 3 to about 30 atmospheres pressure.

26. The process of claim 17 wherein said copper sulfate is thermally decomposed at about 575° to about 1025° C.

27. The process of claim 26 wherein said copper sulfate is thermally decomposed at about 800° to about 1025° C.

28. The process of claim 17 wherein said reaction of cuprous oxide and sulfur trioxide is carried out at about 800° to about 1025° C.

29. The process of claim 17 wherein said cupric oxide is thermally decomposed to cuprous oxide and oxygen at about 1000° to about 1100° C.

30. The process of claim 29 wherein said thermal decomposition is carried out at about 1050° to about 1075° C.

31. The process of claim 17 wherein the electrochemical reactor is operated at an elevated pressure thereby producing pressurized hydrogen.

32. The process of claim 31 wherein the electrochemical reactor is operated at about 5 to about 100 atmospheres pressure.

33. In a reactant regenerative closed cycle process for production of hydrogen and oxygen from water in which an aqueous solution of sulfur dioxide is electrolytically reacted in an electrochemical reactor to produce aqueous sulfuric acid in the anode chamber while producing hydrogen in a separated-cathode chamber and removing said hydrogen from the cycle, the steps comprising:

thermally decomposing cupric oxide to cuprous oxide and to oxygen;

removing said oxygen from the cycle; and reacting said cuprous oxide with sulfur trioxide producing said cupric oxide and sulfur dioxide, said sulfur dioxide being recycled to said electrochemical reactor.

34. The process of claim 33 wherein said cupric oxide is thermally decomposed to cuprous oxide and oxygen at about 1000° to about 1100° C.

35. The process of claim 34 wherein said thermal decomposition is carried out at about 1050° to about 1075° C.

36. The process of claim 33 wherein said reaction of cuprous oxide and sulfur trioxide is carried out at about 800° to about 1025° C.

* * * * *